United States Patent [19]

Winnik

[11] Patent Number: 5,275,647
[45] Date of Patent: * Jan. 4, 1994

[54] INK COMPOSITIONS

[75] Inventor: Francoise M. Winnik, Toronto, Canada

[73] Assignee: Xerox Corporation, Stamford, Conn.

[*] Notice: The portion of the term of this patent subsequent to Nov. 28, 2008 has been disclaimed.

[21] Appl. No.: 797,578

[22] Filed: Nov. 25, 1991

[51] Int. Cl.$^5$ ............................................. C09D 11/02
[52] U.S. Cl. ............................... 106/22 E; 106/20 D; 106/22 H
[58] Field of Search ....................... 106/22-23, 106/22D

[56] References Cited

U.S. PATENT DOCUMENTS

| 1,852,137 | 4/1932 | Whitehead | 8/403 |
|---|---|---|---|
| 3,449,319 | 6/1969 | Kuhn | 534/729 |
| 3,917,447 | 11/1975 | Lazar et al. | 8/583 |
| 4,389,456 | 6/1983 | Marshall | 428/375 |
| 4,426,297 | 1/1984 | Wilson | 252/8.6 |
| 4,509,982 | 4/1985 | Iijima | 106/23 |
| 5,084,098 | 1/1992 | Olson | 106/19 |
| 5,100,471 | 3/1992 | Winnik et al. | 106/23 |

Primary Examiner—Helene Klemanski
Assistant Examiner—Margaret Einsmann
Attorney, Agent, or Firm—E. O. Palazzo

[57] ABSTRACT

An ink composition comprised of a solution comprised of surfactant micelles colored with a dye or dyes covalently attached thereto, and an ink jet printing process utilizing such ink.

5 Claims, No Drawings

INK COMPOSITIONS

BACKGROUND OF THE INVENTION

The present invention is directed to ink compositions and imaging and printing processes thereof. More specifically, in one embodiment the present invention is directed to ink jet ink compositions comprised of surfactant micelles to which are attached reactive dyes. One embodiment of the present invention is directed to an ink composition which comprises an aqueous liquid vehicle and colored particles comprised of a polyoxyethylene-castor oil or a polyoxyethylene-hydrogenated castor oil (HCO) micelle colored by attachment of a water soluble reactive dye to the surface of the micelle. Optionally, silica is precipitated within the micelles by hydrolysis of a silica precursor within the core of the micelles. The inks of the present invention possess a number of advantages including excellent waterfastness characteristics, such as for example exceeding 80 percent, and from between about 85 to about 95 percent; excellent optical density of, for example, from between about 0.8 and 1.5, depending on the color, acceptable edge acuity, minimal feathering on different paper types and on transparencies, stability with storage, stability in the ink jet printhead, the use of nontoxic surfactant type components, the selection of a wide number of dyes for coloring the inks, and the like. Other advantages of inks associated with the present invention in embodiments thereof include the preselection of the colors desired; excellent color intensity of the prints and images developed; control of the physical characteristics of the core by the selection of the surfactant; the selection of the physical characteristics of the core including, for example, its diameter, its hydrophobicity, and the chemical functionality of its surface allows the control of parameters, such as level of dye incorporation in the colorant, the jettability of an ink comprised of these colorants; the generation of prints with excellent characteristics, that is, for example, the image is substantially uniform in color, optical density, of from about 0.8 to about 1.5, depending on the color of the ink; resistance to highlighter marking; formation of clear images on transparencies; the use of a variety of plain papers, such as Xerox Corporation 4024 paper for ink jet printing; and the like. The inks of the present invention can be selected for a number of known ink jet printing methods and apparatus, including thermal ink jet, or bubble jet processes as described in, for example, U.S. Pat. Nos. 4,601,777, 4,251,824, 4,410,899, 4,412,224, and 4,532,530, the disclosures of which are totally incorporated herein by reference.

Ink jet printing systems can generally be classified by two types: continuous stream and drop-on-demand. In continuous stream ink jet systems, ink is emitted in a continuous stream under pressure through at least one orifice or nozzle. The stream is perturbed causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet or bubble jet. With this type, there are apparently generated high velocity droplets and there is allowed very close spacing of the nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydronynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction toward a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known as indicated herein, and are described, for example, in U.S. Pat. Nos. 4,601,777; 4,251,824; 4,410,899; 4,412,224 and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, the ability to perform intercolor ink mixing, compatibility with both coated/treated and plain papers, image edge acuity, reduced image feathering, and nontoxic and nonmutagenic properties.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, copending application U.S. Ser. No. 07/369,003, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads and less stable during storage, disadvantages avoided, or minimized with the inks of the present invention.

The following United States patents are mentioned: U.S. Pat. No. 4,705,567 relating, for example, to heterophase ink compositions comprised of water and a dye covalently attached to a polyethylene glycol, or polyethylene imine component, which component is complexed with a heteropolyanion; U.S. Pat. No. 4,623,689 which discloses, for example, an ink for ink jet recording wherein the ink contains a certain aqueous colored polymer, see the Abstract for example; and as collateral interest U.S. Pat. No. 4,664,708; 4,680,332 and 4,791,165. The disclosures of the aforementioned patents, and all other patents mentioned herein are totally incorporated herein by reference.

Copending application U.S. Ser. No. 544,564 (now abandoned), the disclosure of which is totally incorporated herein by reference, relates, for example, to ink compositions which comprise an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the copending application, the colored particles comprise micelles of block copolymers of the formula ABA having silica precipitated therein and dye molecules covalently attached to the micelles. Another embodiment of the copending application is directed to a printing process which comprises incorporating the ink thereof into an ink jet printing apparatus and causing droplets of the ink to be ejected in an imagewise pattern onto a substrate, thereby generating images on the substrate. Also, in another embodiment of the copending application there is disclosed an ink preparation process which comprises, in the order stated, (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead resulting in deterioration of the print quality. These and other disadvantages, such as poor resistance to rubbing, by another substrate or by hand, are avoided, or minimized with the inks of the present invention.

In copending patent application U.S. Ser. No. 646,904, the disclosure of which is totally incorporated herein by reference, there is illustrated an ink composition which comprises an aqueous liquid vehicle and colored particles comprised of a dendrimer core colored with a dye or dyes covalently attached thereto. In one embodiment, the inks of the copending application are comprised of a solution comprised of a dendrimer with a colored dye, or colored dyes covalently attached thereto. The aforementioned solution usually contains water, and as optional additive components known humectants and known biocides.

While ink compositions are known, a need remains for ink compositions exhibiting advantages of both dye-based inks and pigment-based inks. There is also a need for ink compositions with excellent waterfastness characteristics. A need also remains for ink compositions exhibiting acceptable lightfastness characteristics. In addition, a need exists for ink compositions for which a wide variety of color choices exists. There is also a need for ink compositions that can be prepared by simple and economical processes. Further, there is a need for ink compositions suitable for printing on plain papers, coated or treated papers, and transparency materials. In addition, there is a need for ink compositions that when printed on substrates exhibit excellent optical density, low feathering, for example there is minimal undesirable bleeding of the ink in areas adjacent to the printed images, and excellent rub resistance, for example after strong hand rubbing for an extended period of time, about up to three minutes, the image is not removed or disturbed. There is also a need for ink compositions that when used to print on transparency materials generate images that project their original colors when light is passed through the image. A need also remains for ink compositions with acceptable thermal stability, for example the inks are not substantially adversely effected in the printhead by heat, and storage stability. Further, there is a need for ink compositions suitable for ink jet printing that do not induce clogging of the printhead. A need also remains for ink compositions that when printed on substrates exhibit no undesirable intercolor bleeding between areas of different color.

SUMMARY OF THE INVENTION

It is a feature of the present invention to provide ink compositions with many of the advantages illustrated herein.

It is another feature of the present invention to provide ink compositions with excellent waterfastness characteristics.

It is yet another feature of the present invention to provide ink compositions exhibiting acceptable lightfastness characteristics.

Another feature of the present invention is to provide ink compositions for which a wide variety of color choices exists.

Yet another feature of the present invention is to provide ink compositions that can be prepared by simple and economical processes.

Still another feature of the present invention is to provide ink compositions with colorants comprised of a surfactant with dyes attached.

It is another feature of the present invention to provide ink compositions suitable for printing on plain papers, coated or treated papers, and transparency materials.

It is yet another feature of the present invention to provide ink compositions that when printed on substrates exhibit excellent optical density, low feathering, and excellent rub resistance.

Moreover, another feature of the present invention is to provide ink compositions suitable for ink jet printing, which inks do not induce, or minimize clogging of the ink printheads.

Also, another feature of the present invention is to provide ink compositions that when printed on substrates exhibit minimal, or no undesirable intercolor bleeding between areas of different color.

These and other features of the present invention can be accomplished in embodiments thereof by providing an ink composition which comprises an aqueous liquid vehicle and colored particles comprised of a surfactant with dyes attached thereto. In one embodiment, the inks of the present invention are comprised of a solution comprised of commercially available surfactants with a water insoluble core and tails that are water soluble, and wherein a dye, or dyes are attached to the tails. The aforementioned solution usually contains water, and as optional additive components known humectants, and known biocides.

Examples of surfactants selected for the inks of the present invention generally include polyoxyethylene castor oil surfactants comprised of a castor oil core substituted with polyoxyethylene chains of general structure $—(O—CH_2CH_2)_n—$, where n can be from between about 2 to about 100, and preferably from about 20 to 60 such as, for example, the surfactants known as CO-3 TM, CO-10 TM, CO-20TX TM, CO-40TX TM and CO-60TX TM, all available from Nikko Chemicals Company, Tokyo, polyoxyethylene hydrogenated castor oil surfactants comprised of a hydrogenated castor oil core substituted with polyoxyethylene chains of general structure $—(O—CH_2CH_2)_n—$, where n can be from between about 2 to about 100, and preferably from about 20 to 60, such as, for example, the surfactants known as HCO-5 TM, HCO-7.5 TM, HCO-10 TM, HCO-20 TM, HCO-30 TM, HCO-40 TM, HCO-50 TM, HCO-60 TM, HCO-80 TM and HCO-100 TM, all available from Nikko Chemicals Company, Tokyo, polyethyleneimine castor oil surfactant consisting of a castor oil core substituted with polyethylene imine chains of general structure $—(NH—CH_2CH_2)_n—$, where n can be from between about 2 to about 100, and preferably from about 10 to 50, polyethyleneimine hydrogenated castor oil surfactants, comprised of a hydrogenated castor oil core substituted with polyethylene imine chains of the general structure $—(NH—CH_2CH_2)_n—$, where n is from between about 2 to about 100, and preferably from about 10 to 50, and the like.

Another embodiment of the present invention is directed to a printing process which comprises incorporating an ink of the present invention into an ink jet printing apparatus and causing droplets of the ink to be ejected in an imagewise pattern onto a substrate, thereby generating images on the substrate.

The liquid vehicle of the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally posess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight.

Optional known additives can be present in the inks of the present invention as indicated herein, such as biocides like DOWICIL TM 150, 200, and 75, benzoate salts, sorbate salts, and the like, present in an effective amount of, for example, from about 0.0001 to about 4 percent by weight, and preferably from about 0.01 to about 2.0 percent by weight; humectants such as ethylene glycol, diethyleneglycol, N-methylpyrolidinone, propylene glycol, hydroxyethers, ethers, amides, sulfoxides, ketones, lactones, esters, alcohols, and the like, present in an effective amount of, for example, from 0 to about 50 percent by weight, and preferably from about 5 to about 40 percent by weight, pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

To prepare the colorants in embodiments, the selected surfactant is first admixed with water, preferably water that has been distilled or deionized, generally in a concentration of from between about 0.05 percent by weight to about 5 percent by weight to obtain colorless micelles. Although it is desired not to be limited by theory, when surfactants are added to water at concentrations higher than a critical concentration they aggregate to form clusters known as micelles, as discussed, for example, in *Principles of Colloids and Surface Chemistry*, Second Edition, Paul C. Hiemenz, Marcel Dekker, New York, N.Y., 1986, chapter 8, the disclosure of which is totally incorporated herein by reference. In embodiments of the present invention, when the surfactants are selected for the preparation of the colorants, the diameter of the micelles range from between about 2 to about 20 nanometers depending for example, on the size of the surfactant hydrophilic tail as discussed, for example, in J. L. Burns, Y. Cohen, and Y. Talmon, *Journal of Physical Chemistry*, 94, 5308 to 5312 (1991) and the references therein, the disclosures of which are totally incorporated herein by reference. Subsequently, a water-soluble base, such as aqueous ammonium hydroxide, potassium hydroxide, sodium carbonate, and the like, organic amines, such as for example methyl amine, ethyl amine, propyl amine, and the like, is added to the water dispersion of micelles in an amount sufficient to raise the pH of the dispersion to at least 8. Typically, the base is added to the dispersion in an amount from between about 5 to about 20 percent by weight of the total dispersion. A solution of reactive dye dissolved in water typically at a concentration of from about 1 to about 10 percent by weight is then added to the dispersion, generally at room temperature, typically in a relative amount of from about 5 to about 30 percent by weight of micelles. The reactive groups of the dyes undergo a chemical reaction with the terminal hydroxyl groups present at the surface of the micelles resulting in the formation of a covalent bond between the dye and the micelle. The exact nature of the chemical reaction depends on the structure of the reactive group, as indicated, for example, in *Color Chemistry: Syntheses, Properties, and Applications of Organic Dyes and Pigments*, H. Zollinger, VCH Publishers, Weinheim, Germany, 1987, page 136, the disclosure of which is totally incorporated herein by reference. When the reaction between the dye and the micelle is completed (typically within 24 hours), the mixture is purified by an ultrafiltration process using, for example, membranes with a molecular cut-off of 30,000 to remove excess reactive dye and other low-molecular weight impurities. Subsequent to purification, the resulting suspension comprised of the colorant dispersed in water can be concentrated for use in an ink. Optionally the colorant can be isolated by freeze-drying using a freeze-dryer, such as, for example, the Dura-dry Freeze-dryer available from FTS Systems Inc., Stone Ridge, N.Y.

In one specific embodiment of the present invention, the colored micelles comprise micelles of the selected surfactants, said micelles having silica precipitated therein, wherein dye molecules are attached to the micelle surfaces. The colored micelles can be prepared by first admixing the selected surfactant with water, preferably water that has been distilled or deionized, generally in a concentration of from about 0.05 percent by weight to about 5 percent by weight to obtain colorless micelles of an average diameter of from about 9 to about 60 nanometers. Subsequently, a tetraalkoxysilane wherein the alkyl group has from about one to about 16 carbon atoms, such as tetraethoxysilane, is added to the dispersion of micelles, typically in a relative amount of from about 1 to about 30 percent by weight of micelles, and the dispersion is stirred until the silica precursor is dissolved in the core of the micelles, generally from about 15 minutes to about 2 hours. Additional examples of suitable silane materials include tetramethoxysilane, tetra-n-propoxysilane, tetra-i-propoxysilane, tetra-n-butoxysilane, tetra-s-butoxysilane, tetrapentoxysilane, tetrakis-(2-methoxyethoxysilane) and the like. Thereafter, a water-soluble base, such as aqueous ammonium hydroxide, potassium hydroxide, sodium carbonate, and the like, organic amines, such as for example methyl amine, ethyl amine, propyl amine, and the like, is added to the water dispersion of micelles, in an amount sufficient to raise the pH of the dispersion to at least 8. Typically the base is added to the dispersion in an amount from about 5 to about 20 percent by weight of the total dispersion. Subsequently, a solution of reactive dye dissolved in water typically at a concentration of from about 1 to about 10 percent by weight is then added to the dispersion, generally at room temperature, typically in a relative amount of from about 5 to about 30 percent by weight of micelles. When the reaction between the dye and the micelle is completed (typically within 24 hours), the mixture is purified by an ultrafiltration process using, for example, membranes with a molecular cut-off of 30,000 to remove excess reactive dye and other low-molecular weight impurities. Subsequent to purification, the suspension of colored micelles can be concentrated for use in an ink. Optionally the colored silicated micelles can be isolated by freeze-drying. It is believed that the network of silica precipitated within the micelles enhance the properties of an ink containing the particles, particularly with respect to thermal stability.

Examples of dyes selected for the inks of the present invention generally include any known dyes, such as the Reactive Dyes. These dyes typically comprise a chromophore soluble in water, such as an anthraquinone, a monoazo dye, a disazo dye, a phthalocyanine, an aza[18]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m-carboxypyridinium)-triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a β-chloroethylsulfone, a 4,5-dichloro-6-pyridazone, an α-bromoacryloylamido, an α,β-dibromopropionylamido, and the like. Examples of suitable dyes include LEVAFIX BRILLIANT YELLOW E-GA TM, LEVAFIX YELLOW E2RA TM, LEVAFIX BLACK EB TM, LEVAFIX BLACK E-2G TM, LEVAFIX BLACK P-36A TM, LEVAFIX BLACK PN-L TM, LEVAFIX BRILLIANT RED E6BA TM, and LEVAFIX BRILLIANT BLUE EFFA TM, available from Bayer, PROCION TURQUOISE PA TM, PROCION TURQUOISE HA TM, PROCION TURQUOISE H-5G TM, PROCION TURQUOISE H-7G TM, PROCION RED MX-5B TM, PROCION RED MX 8B GNS TM, PROCION RED G TM, PROCION YELLOW MX-8G TM, PROCION BLACK H-EXL TM, PROCION BLACK P-N TM, PROCION BLUE MX-R TM, PROCION BLUE MX-4GD TM, PROCION BLUE MX-G TM, and PROCION BLUE MX-2GN TM, available from Imperial Chemicals Incorporated, CIBACRON RED F-B TM, CIBACRON BLACK BG TM, LANASOL BLACK B TM, LANASOL RED 5B TM, LANASOL RED B TM, and LANASOL YELLOW 4G TM, available from Ciba-Geigy, BASILEN BLACK P-BR TM, BASILEN YELLOW EG TM, BASILEN BRILLANT YELLOW P-3GN TM, BASILEN YELLOW M-6GD TM, BASILEN BRILLIANT RED P-3B TM, BASILEN SCARLET E-2G TM, BASILEN RED E-B TM, BASILEN RED E-7B TM, BASILEN RED M-5B TM, BASILEN BLUE E-R TM, BASILEN BRILLIANT BLUE P-3R TM, BASILEN BLACK P-BR TM, BASILEN TURQUOISE BLUE P-GR TM, BASILEN TURQUOISE M-2G TM, BASILEN TURQUOISE E-G TM, and BASILEN GREEN E-6B TM, available from BASF, SUMIFIX TURQUOISE BLUE G TM, SUMIFIX TURQUOISE BLUE H-GF TM, SUMIFIX BLACK B TM, SUMIFIX BLACK H-BG TM, SUMIFIX YELLOW 2GC TM, SUMIFIX SUPRA SCARLET 2GF TM, and SUMIFIX BRILLIANT RED 5BF TM, available from Sumitomo Chemical Company, INTRACRON YELLOW C-8G TM, INTRACRON RED C-8B TM, INTRACRON TURQUOISE BLUE GE TM, INTRACRON TURQUOISE HA TM, and INTRACRON BLACK RL TM, available from Crompton and Knowles, Dyes and Chemicals Division, DUASYN BLACK RL-SF TM, DUASYN BRILLIANT YELLOW GL-SF TM, DUASYN BRILLIANT RED F3B-SF TM, and DUASYN RED 3B-SF TM, available from Hoechst, REACTIVE YELLOW 86 TM, available from Sigma Chemical Company, REACTIVE BLACK 5 TM, REACTIVE BLUE 4 TM, REACTIVE BLUE 15 TM, REACTIVE ORANGE 16 TM, REACTIVE RED 4 TM, and REACTIVE YELLOW 2 TM, available from Aldrich Chemical Company Incorporated, and the like. One dye or mixtures thereof may be selected in embodiments of the present invention.

The colored micelles can have dye molecules attached to the micelle surfaces in any amount sufficient to impart to the micelles the desired intensity and hue of color. Typically, the colored micelles contain the dye in an amount of from between about 0.5 to about 20 percent by weight, preferably from about 2 to about 7 percent by weight. When the micelles have silica dispersed therein, the colored micelles typically contain from about 60 to about 98 percent by weight of the surfactant, from about 1.5 to about 39.5 percent by weight of silica, and from about 0.5 to about 20 percent by weight of the dye. Examples of dyes suitable for the coloration of the micelles include all the dyes listed previously. Preferred dyes include, for example, PROCION TURQUOISE HA-GNRS TM and PROCION YELLOW MX-8G TM, available from ICI; BASILEN PBR BLACK RL-SF TM, available from BASF; REACTIVE BLACK 5 TM and REACTIVE ORANGE 16 TM, available from Aldrich Chemical Corporation, LEVAFIX BRILLIANT RED EGBA TM, available from Bayer, and DUASYN BLACK RL-SF TM, available from Hoechst.

The ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the Diable C150 IJ TM printer, Hewlett Packard DESK JET TM printers, the Diablo C150 TIJ TM printer, or the like. Particularly preferred is a thermal ink jet printing apparatus. The inks of the present invention can be used to form images on a wide variety of substrates, including plain paper such as Xerox 4024 paper, bond paper, such as GILBERT ® 25 percent cotton bond paper or GILBERT ® 100 percent cotton bond paper, silica coated papers, transparency materials, fabrics, plastics, polymeric films, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

There was prepared a cyan ink as follows. To 347.7 milliliters of deionized water were added 6.1 grams of a surfactant (HCO-60 TM, a polyoxyethylene hydrogenated castor oil, obtained from Nikko Chemicals Corporation) and the resulting solution was stirred at room temperature for 1 hour. Thereafter, 33.5 milliliters of 11.2 molar aqueous ammonium hydroxide were added and the resulting mixture was stirred at room temperature for 1 hour. Subsequently, a solution of 2.0 grams of PROCION TURQUOISE HA-GRNS TM (cyan reactive dye), available from Imperial Chemicals Incorporated, in 25 milliliters of deionized water was added to the dispersion and the mixture was stirred overnight, 18 hours, at room temperature, about 25° C. The dispersion of colored micelles thus obtained was diluted to 1,000 milliliters by the addition of deionized water and the excess reactive dye was removed by ultrafiltration with a Minitan System, available from Millipore, equipped with two 30K polysulfone membranes. The resulting dark colored solution was concentrated to 200 milliliters by solvent evaporation in a rotary evaporator under reduced pressure.

An ink was then formulated by adding to 20 milliliters of the above obtained mixture comprised of 5.2 percent by weight of the above cyan colorant and 94.8 percent by weight of water, 1.0 milliliter of diethylene glycol. The resulting mixture was filtered through a 0.45 micron filter. There resulted a cyan ink comprised of 5.2 percent by weight of a cyan colorant, 89.8 percent by weight of water, and 5.0 percent by weight of diethylene glycol. The cyan ink prepared was then incorporated in a DESK JET TM Hewlett Packard ink jet printer. Prints were formed on plain papers (Xerox 4024 #14, 16, and 19) obtained from Xerox Corporation, on silica coated FC-3 paper, obtained from Jujo Inc. of Japan, and on a transparency material 3R3351, obtained from Xerox Corporation. In each instance, the cyan prints obtained exhibited solid areas of acceptable optical density as measured with a Macbeth TR927 Optical Densitometer (1.55 on coated paper, 1.22 on Xerox 4024 #16 paper/felt side, 1.10 on Xerox 4024 #16 paper/wire side, and 2.47 on transparency). Feathering, the bleeding of ink from printed areas to nonprinted areas, or the sharpness of the edges of solid printed areas as observed by visual inspection with the aid of an optical microscope was minimal on both the felt side and the wire side of the uncoated paper. In addition, the prints on the Xerox 4024 #14 paper exhibited a waterfastness of 85.6 percent (0.83 divided by 0.97 multiplied by 100) as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 0.97 and the optical density of the sheet soaked in water was 0.83.

EXAMPLE II

There was prepared a cyan ink as follows. To 347.7 milliliters of deionized water were added 6.1 grams of a surfactant (HCO-60 TM, obtained from Nikko Chemicals Corporation) and the resulting solution was stirred at room temperature for 1 hour. Thereafter, 1.55 milliliters of tetraethoxysilane obtained from Aldrich Chemical Corporation were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 2.1 grams of PROCION TURQUOISE HA-GRNS TM, avaiable from Imperial Chemicals Incorporated, in 25 milliliters of deionized water were added to the dispersion and the mixture was stirred overnight at room temperature. The dispersion of colored silicated micelles thus obtained was diluted to 1,000 milliliters by the addition of deionized water and the excess reactive dye was removed by ultrafiltration with a Minitan System, available from Millipore, equipped with two 30K polysulfone membranes. The resulting dark colored solution was concentrated to 200 milliliters by evaporation of the water in a rotary evaporator under reduced pressure. Complete removal of the solvent was achieved by freeze drying, yielding 1.5 grams of a dark blue powder comprised of 32 parts by weight of dye, as determined by visible absorption spectroscopy, 25 parts by weight of silica, as determined by elemental analysis, and 43 parts by weight of surfactant.

An ink was then formulated by dissolving 1.0 gram of the dark blue powder into 20 milliliters of a mixture consisting of 18 milliliters of water and 2.0 milliliters of diethylene glycol. The mixture was filtered through a 0.45 micron filter. There resulted a cyan ink comprised of 5.0 percent by weight of a cyan colorant, 90.0 percent by weight of water, and 5.0 percent by weight of diethylene glycol. The cyan ink thus prepared was incorporated in a DESK JET TM Hewlett Packard ink jet printer. Prints were formed on plain papers (Xerox 4024 #14, 16, and 19) obtained from Xerox Corporation, and on silica coated FC-3 paper, obtained from Jujo Inc. of Japan. In each instance the cyan prints obtained exhibited solid areas of acceptable optical density as measured with a Macbeth TR927 Optical Densitometer (1.45 on coated paper, 1.18 on Xerox 4024 #16 paper/felt side, 1.16 on Xerox 4024 #16 paper/wire side). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 88 percent, as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

EXAMPLE III

There was prepared a black ink as follows. To 347.7 milliliters of deionized water were added 6.1 grams of a surfactant (HCO-60 TM, obtained from Nikko Chemicals Corporation) and the resulting solution was stirred at room temperature for 1 hour. Thereafter, 1.55 milliliters of tetraethoxysilane, obtained from Aldrich Chemical Corporation, were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 3.1 grams of BASILEN PBR BLACK RL-SF TM, available from BASF, in 30 milliliters of deionized water was added to the dispersion and the mixture was stirred overnight at room temperature. The dispersion of colored silicated micelles thus obtained was diluted to 1,000 milliliters by the addition of deionized water and the excess reactive dye was removed by ultrafiltration with a Minitan System, available from Millipore, equipped with two 30K polysulfone membranes. The resulting black solution was concentrated to 200 milliliters by evaporation of the water in a rotary evaporator under reduced pressure.

An ink was then formulated by adding to 20 milliliters of the obtained mixture comprised of 5.2 percent by weight of the cyan colorant and 94.8 percent by weight of water, 1.0 milliliter of diethylene glycol. The mixture was filtered through a 0.45 micron filter. There resulted a black ink comprised of 5.2 percent by weight of a black colorant, 89.8 percent by weight of water, and 5.0 percent by weight of diethylene glycol. The black ink thus prepared was incorporated in a DESK JET TM Hewlett Packard ink jet printer. Prints were formed on plain papers (Xerox 4024 #14, 16, and 19)

obtained from Xerox Corporation, and on silica coated FC-3 paper, obtained from Jujo Inc. of Japan. In each instance, the black prints obtained exhibited solid areas of acceptable optical density as measured with a Macbeth TR927 Optical Densitometer (1.65 on coated paper, 1.32 on Xerox 4024 #16 paper/felt side, 1.08 on Xerox 4024 #16 paper/wire side). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 84 percent as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

EXAMPLE IV

There was prepared a black ink as follows. To 347.7 milliliters of deionized water were added 6.1 grams of a surfactant (HCO-20 TM, obtained from Nikko Chemicals Corporation) and the resulting solution was stirred at room temperature for 1 hour. Thereafter, 1.55 milliliters of tetraethoxysilane obtained from Aldrich Chemical Corporation were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 2.0 grams of BASILEN PBR BLACK RL-SF TM, available from BASF, and 1.64 grams of REACTIVE ORANGE 16 TM, obtained from Aldrich Chemical Corporation, in 25 milliliters of deionized water was added to the dispersion and the mixture was stirred overnight at room temperature. The dispersion of black silicated micelles thus obtained was diluted to 1,000 milliliters by the addition of deionized water and the excess reactive dye was removed by ultrafiltration with a Minitan System, available from Millipore, equipped with two 30K polysulfone membranes. The resulting black solution was concentrated to 200 milliliters by evaporation of the water in a rotary evaporator under reduced pressure.

An ink was then formulated by adding to 20 milliliters of the obtained mixture 1.0 milliliter of diethylene glycol. The mixture was filtered through a 0.45 micron filter. There resulted a black ink comprised of 6.2 percent by weight of a black colorant, 88.8 percent by weight of water, and 5.0 percent by weight of diethylene glycol. The black ink thus prepared was incorporated in a DESK JET TM Hewlett Packard ink jet printer. Prints were formed on plain papers (Xerox 4024 #14, 16, and 19) obtained from Xerox Corporation, and on silica coated FC-3 paper, obtained from Jujo Inc. of Japan. In each instance the black prints obtained exhibited solid areas of acceptable optical density as measured with a Macbeth TR927 Optical Densitometer (1.75 on coated paper, 1.44 on Xerox 4024 #16 paper/left side, 1.38 on Xerox 4024 #16 paper/wire side). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 84 percent as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

EXAMPLE V

There was prepared a black ink as follows. To 347.7 milliliters of deionized water were added 6.1 grams of a surfactant (CO-20X TM, obtained from Nikko Chemicals Corporation) and the resulting solution was stirred at room temperature for 1 hour. Thereafter, 1.55 milliliters of tetraethoxysilane, obtained from Aldrich Chemical Corporation, were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 2.0 grams of BASILEN PBR BLACK RL-SF TM, available from BASF, and 1.64 grams of REACTIVE ORANGE 16 TM, obtained from Aldrich Chemical Corporation, in 25 milliliters of deionized water was added to the dispersion and the mixture was stirred overnight at room temperature. The dispersion of colored silicated micelles thus obtained was diluted to 1,000 milliliters by the addition of deionized water, and the excess reactive dye was removed by ultrafiltration with a Minitan System, available from Millipore, equipped with two 30K polysulfone membranes. The resulting black solution was concentrated to 200 milliliters by evaporation of the water in a rotary evaporator under reduced pressure.

An ink was then formulated by adding to 20 milliliters of the obtained mixture 1.0 milliliter of diethylene glycol. The mixture was filtered through a 0.45 micron filter. There resulted a black ink comprised of 4.8 percent by weight of a black colorant, 91.2 percent by weight of water, and 5.0 percent by weight of diethylene glycol. The black ink thus prepared was incorporated in a DESK JET TM Hewlett Packard ink jet printer. Prints were formed on plain papers (Xerox 4024 #14, 16, and 19) obtained from Xerox Corporation, on silica coated FC-3 paper, obtained from Jujo Inc. of Japan, and on a transparency material 3R3351, obtained from Xerox Corporation. In each instance, the black prints obtained exhibited solid areas of acceptable optical density as measured with a Macbeth TR927 Optical Densitometer (1.46 on coated paper, 1.14 on Xerox 4024 #16 paper/felt side, 0.98 on Xerox 4024 #16 paper/wire side, and 2.47 on transparency). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 86 percent, as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

EXAMPLE VI

There was prepared a magenta ink as follows. To 347.7 milliliters of deionized water were added 6.1 grams of a surfactant (HCO-20 TM, obtained from Nikko Chemicals Corporation) and the resulting solution was stirred at room temperature for 1 hour. Thereafter, 1.55 milliliters of tetraehoxysilane obtained from Aldrich Chemical Corporation were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 2.0 grams of LEVAFIX BRILLIANT RED EGBA TM, obtained from Bayer, in 25 milliliters of deionized water was added to the dispersion and the mixture was stirred overnight at room temperature. The dispersion of colored silicated micelles thus obtained was diluted to 1,000 milliliters by the addition of deionized water and the excess reactive dye was removed by ultrafiltration with a Minitan System, available from Millipore, equipped with two 30K polysulfone membranes. The resulting deep red-purple solution was concentrated to 200 milliliters by evaporation of the water in a rotary evaporator under reduced pressure.

An ink was then formulated by adding to 20 milliliters of the obtained mixture 1.0 milliliter of diethylene glycol. The mixture was filtered through a 0.45 micron filter. There resulted a magenta ink comprised of 5.5 percent by weight of a magneta colorant, 89.1 percent by weight of water, and 5.0 percent by weight of diethylene glycol. The magenta ink thus prepared was incorporated in a DESK JET TM Hewlett Packard ink jet printer. Prints were formed on plain papers (Xerox 4024 #14, 16, and 19) obtained from Xerox Corporation, and on silica coated FC-3 paper, obtained from Jujo Inc. of Japan. In each instance, the magenta prints obtained exhibited solid areas of acceptable optical density as measured with a Macbeth TR927 Optical Densitometer (1.15 on coated paper, 1.07 on Xerox 4024 #16 paper/felt side, 0.96 on Xerox 4024 #16 paper/wire side). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 84 percent, as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

EXAMPLE VII

There was prepared a yellow ink as follows. To 347.7 milliliters of deionized water were added 6.1 grams of a surfactant (HCO-60 TM, obtained from Nikko Chemicals Corporation) and the resulting solution was stirred at room temperature for 1 hour. Thereafter, 1.55 milliliters of tetraethoxysilane obtained from Aldrich Chemical Corporation were added to the dispersion and the mixture was stirred vigorously with a magnetic stirrer for 1 hour at room temperature. Thereafter, 33.5 milliliters of 11.2 molar aqueous ammonium hydroxide were added and the resulting mixture was stirred at room temperature for 1 hour. Subsequently, a solution of 2.0 grams of PROCION YELLOW MX-8G TM, obtained from Imperial Chemicals Corporation, in 25 milliliters of deionized water was added to the dispersion and the mixture was stirred overnight at room temperature. The dispersion of colored silicated micelles thus obtained was diluted to 1,000 milliliters by the addition of deionized water and the excess reactive dye was removed by ultrafiltration with a Minitan System, available from Millipore, equipped with two 30K polysulfone membranes. The resulting orange solution was concentrated to 200 milliliters by evaporation of the water in a rotary evaporator under reduced pressure.

An ink was then formulated by adding to 20 milliliters of the obtained mixture 1.0 milliliter of diethylene glycol. The mixture was filtered through a 0.45 micron filter. There resulted a yellow ink comprised of 7.2 percent by weight of a yellow colorant, 87.8 percent by weight of water, and 5.0 percent by weight of diethylene glycol. The yellow ink thus prepared was incorporated in a DESK JET TM Hewlett Packard ink jet printer. Prints were formed on plain papers (Xerox 4024 #14, 16, and 19) obtained from Xerox Corporation, and on silica coated FC-3 paper, obtained from Jujo Inc. of Japan. In each instance, the yellow prints obtained exhibited solid areas of acceptable optical density as measured with a Macbeth TR927 Optical Densitometer (1.15 on coated paper, 1.04 on Xerox 4024 #16 paper/felt side, 0.86 on Xerox 4024 #16 paper/wire side). Feathering, the bleeding of ink from printed areas to nonprinted areas, or the sharpness of the edges of solid printed areas as observed by visual inspection, with the aid of an optical microscope, was minimal on both the felt side and the wire side of the uncoated paper. In addition, the prints on the Xerox 4024 #14 paper exhibited a waterfastness of 88 percent, as determined by cutting a printed solid area on Xerox 4024 paper (wire side) into two sheets, soaking one sheet in water for 2 minutes, air drying the soaked sheets for 24 hours at ambient temperature, and measuring the optical densities of both the soaked and unsoaked sheets.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition comprised of a solution comprised of surfactant micelles colored with a reactive dye or reactive dyes covalently attached thereto, and a humectant, and wherein the surfactant is comprised of a polyoxyethylene castor oil.

2. An ink composition comprised of a solution consisting essentially of a surfactant comprised of a water insoluble core and water soluble tails, and wherein there is attached to each tail a dye, and wherein the surfactant is a polyoxyethylene castor oil, a polyoxyethylene hydrogenated castor oil, or a polyethylene amine castor oil with a castor oil core substituted with polyethylene imine chains.

3. An ink in accordance with claim 2 wherein the core is comprised of hydrogenated castor oil.

4. An ink in accordance with claim 2 wherein the tails are comprised of polyoxyethylene chains.

5. An ink composition comprised of a solution comprised of surfactant micelles colored with a reactive dye covalently attached thereto, and wherein the surfactant is comprised of a polyoxyethylene hydrogenated castor oil.

* * * * *